(12) United States Patent
Lee

(10) Patent No.: US 11,404,172 B2
(45) Date of Patent: Aug. 2, 2022

(54) HOME APPLIANCE AND METHOD FOR CONTROLLING THEREOF

(71) Applicant: Samsung Electronics Co., Ltd., Suwon-si (KR)

(72) Inventor: Nokhaeng Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/793,700

(22) Filed: Feb. 18, 2020

(65) Prior Publication Data

US 2020/0286635 A1    Sep. 10, 2020

(30) Foreign Application Priority Data

Mar. 4, 2019  (KR) .................. 10-2019-0024929

(51) Int. Cl.
```
G06F 15/173    (2006.01)
G16Y 40/10     (2020.01)
G16Y 40/35     (2020.01)
D06F 23/00     (2006.01)
```

(52) U.S. Cl.
CPC .............. *G16Y 40/10* (2020.01); *D06F 23/00* (2013.01); *G16Y 40/35* (2020.01)

(58) Field of Classification Search
USPC ......................................................... 709/224
See application file for complete search history.

(56) References Cited

U.S. PATENT DOCUMENTS

| | | |
|---|---|---|
| 6,591,198 B1 | 7/2003 | Pratt |
| 8,521,170 B2 | 8/2013 | Buckley et al. |
| 2008/0110459 A1* | 5/2008 | Farbarik ........... A61M 16/0051 128/204.18 |
| 2010/0082201 A1* | 4/2010 | Pfau .................... B60H 1/00828 701/36 |
| 2010/0201299 A1* | 8/2010 | Emde ....................... H02P 6/34 318/503 |
| 2012/0198274 A1* | 8/2012 | Cho ........................ H04L 12/12 714/15 |
| 2013/0166076 A1 | 6/2013 | Karr |
| 2014/0094973 A1* | 4/2014 | Giaimo, III ........ G10K 11/1785 700/280 |

(Continued)

FOREIGN PATENT DOCUMENTS

| | | |
|---|---|---|
| CN | 104514119 B | 2/2017 |
| EP | 3 282 645 A1 | 2/2018 |

(Continued)

OTHER PUBLICATIONS

International Search Report with Written Opinion dated Jun. 17, 2020; International Appln. No. PCT/KR2020/002485.

(Continued)

*Primary Examiner* — Anh Nguyen
*Assistant Examiner* — Tesfu N Mekonen
(74) *Attorney, Agent, or Firm* — Jefferson IP Law, LLP

(57) ABSTRACT

A home appliance is provided. The home appliance includes a motor configured to execute a predetermined function of the home appliance, and a processor configured to determine an upper limit of noise of the home appliance based on ambient noise information of the home appliance and control a driving speed of the motor to have magnitude of noise of the home appliance equal to or less than the upper limit of the noise.

16 Claims, 13 Drawing Sheets

(56) References Cited

U.S. PATENT DOCUMENTS

| | | | |
|---|---|---|---|
| 2015/0119758 A1 | 4/2015 | Rogers et al. | |
| 2015/0300671 A1* | 10/2015 | Coleman | G05B 15/02 |
| | | | 700/276 |
| 2017/0070170 A1 | 3/2017 | Emde et al. | |
| 2017/0209341 A1* | 7/2017 | Potucek | G05B 19/0423 |
| 2017/0221325 A1* | 8/2017 | Cruz-Hernandez | B60Q 9/00 |
| 2019/0172328 A1* | 6/2019 | Cruz-Hernandez | G08B 6/00 |
| 2019/0219280 A1* | 7/2019 | Chitrala | F24F 13/24 |
| 2019/0333494 A1* | 10/2019 | Park | H04R 3/005 |

FOREIGN PATENT DOCUMENTS

| | | |
|---|---|---|
| JP | 04-325193 A | 11/1992 |
| JP | 10-244091 A | 9/1998 |
| JP | 2002-312866 A | 10/2002 |
| JP | 2011-163037 A | 8/2011 |
| JP | 4877339 B2 | 2/2012 |
| JP | 2012-165486 A | 8/2012 |
| JP | 2017-034470 A | 2/2017 |
| JP | 6151094 B2 | 6/2017 |
| KR | 10-2000-0015690 A | 3/2000 |
| KR | 10-2008-0091191 A | 10/2008 |
| KR | 10-0888506 B1 | 3/2009 |
| KR | 10-2014-0073861 A | 6/2014 |
| KR | 10-1447148 B1 | 10/2014 |
| WO | 2020/060297 A1 | 3/2020 |

OTHER PUBLICATIONS

European Search Report dated Jul. 28, 2020; European Appln. No. 20159380.3-1202.

* cited by examiner

HOME APPLIANCE AND METHOD FOR CONTROLLING THEREOF

CROSS-REFERENCE TO RELATED APPLICATION(S)

This application is based on and claims priority under 35 U.S.C. § 119(a) of a Korean patent application number 10-2019-0024929, filed on Mar. 4, 2019 in the Korean Intellectual Property Office, the disclosure of which is incorporated by reference herein in its entirety.

BACKGROUND

1. Field

The disclosure relates to a home appliance and a method for controlling thereof. More particularly, the disclosure relates to a home appliance controlling noise generation of the home appliance in consideration of ambient noise of the home appliance and a method for controlling thereof.

2. Description of Related Art

In general, home appliances such as a refrigerator, a washing machine, and the like include motors for executing specific functions. However, a process of driving a motor for executing a function may cause loud noise.

Recently, in order to prevent inconvenience of a user due to noise, a method for reducing noise generation of a home appliance by detecting vibration generated by a motor using an accelerometer of the home appliance and reducing a driving speed of the motor, when the detected vibration exceeds a threshold value has been applied.

However, in the above-described method, the driving speed of the motor was collectively controlled without any consideration regarding a state of the ambient noise of the home appliance. Accordingly, there was a problem that the driving speed of the motor was unnecessarily controlled, even when inconvenience of a consumer due to the noise generated by the home appliance was offset due to generation of loud noise around the home appliance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a home appliance controlling noise generation of the home appliance in consideration of ambient noise of the home appliance and a method for controlling thereof.

Additional aspects will be set forth in part in the description which follows and, in part, will be apparent from the description, or may be learned by practice of the presented embodiments.

In accordance with an aspect of the disclosure, a home appliance is provided. The home appliance includes a motor operating for executing a predetermined function of the home appliance, and a processor configured to determine an upper limit of noise of the home appliance based on ambient noise information of the home appliance, and control a driving speed of the motor to have magnitude of noise of the home appliance equal to or less than the upper limit of the noise.

In accordance with another aspect of the disclosure, a method for controlling a home appliance is provided. The method includes determining an upper limit of noise of the home appliance based on ambient noise information of the home appliance, and controlling a driving speed of the motor to have magnitude of noise of the home appliance equal to or less than the upper limit noise.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
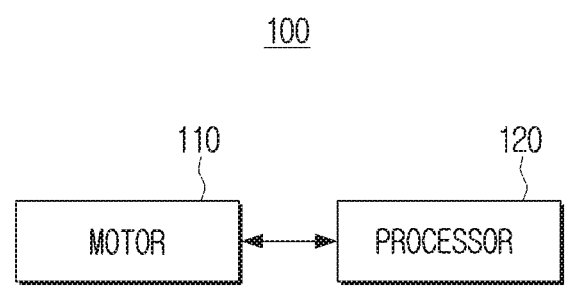
FIG. 1 is a block diagram for describing a configuration of a home appliance according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art is omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, operation, element, part, or a combination thereof, and not to preclude a presence or a possibility of adding one or more of other characteristics, numbers, steps, operations, elements, parts or a combination thereof.

Hereinafter, with reference to the accompanying drawings, embodiments will be described in detail so that those skilled in the art to which the disclosure belongs to can easily make and use the embodiments. But, the disclosure may be implemented in various different forms and is not limited to the embodiments described herein. In addition, in the drawings, the parts not relating to the description are omitted for clearly describing the disclosure.

Hereinafter, the disclosure will be described in detail with reference to the drawings.

FIG. 1 is a block diagram for describing a configuration of a home appliance according to an embodiment of the disclosure.

Referring to FIG. 1, a home appliance 100 may consist of a motor 110 and a processor 120.

The home appliance 100 may generate vibration and noise due to the driving of the motor 110 while executing its primary function. For example, the home appliance 100 may correspond to a washing machine, a refrigerator, or a cleaner and is not limited thereto.

The motor 110 is disposed in the home appliance 100 and allows the driving of elements relating to the execution of the function of the home appliance 100. For example, in a case where the home appliance 100 is a washing machine, the motor 110 may rotate a drum accommodating laundry at a high speed for dehydration of the laundry. At that time, vibration and noise may be generated while driving the drum by the motor 110.

In another example, in a case where the home appliance 100 is a refrigerator, the motor 110 may drive a refrigerant compressor generating a refrigerant. At that time, vibration and noise may be generated while driving the refrigerant compressor by the motor 110.

The processor 120 may control each element in the home appliance 100. Specifically, when an instruction regarding a specific function is received, the processor 120 may control an operation of an element relating to the execution of the function. For example, in a case where the home appliance 100 is a washing machine, when a dehydration instruction is received, the processor 120 may control an operation of the motor 110 to provide rotation power to a drum accommodating laundry.

The processor 120 may determine an upper limit of noise of the home appliance 100 based on ambient noise information of the home appliance 100. The upper limit of the noise of the home appliance 100 corresponds to a maximum allowable magnitude of noise generated by the home appliance 100. The upper limit of the noise of the home appliance 100 may be expressed in a unit of decibel (dB). The unit of the upper limit of the noise of the home appliance 100 is not limited to the example described above.

Specifically, the processor 120 may confirm a magnitude of ambient noise of the home appliance 100 included in the ambient noise information of the home appliance 100, and determine the upper limit of the noise of the home appliance 100 using the confirmed magnitude of ambient noise of the home appliance 100. The ambient noise should be external noise and should not contain the noise generated by the home appliance. That is, the ambient noise should be ambient noise of other devices that are proximate to the home appliance.

More specifically, the processor 120 may determine magnitude of noise identical to the confirmed magnitude of the ambient noise of the home appliance 100 as the upper limit of the noise of the home appliance 100 or may determine magnitude of noise smaller or greater than the confirmed magnitude of the ambient noise of the home appliance 100 by predetermined magnitude as the upper limit of the noise of the home appliance 100.

For example, when the confirmed magnitude of the ambient noise of the home appliance 100 is 60 dB, the processor 120 may determine 60 dB that is identical to the magnitude of the ambient noise as the upper limit of the noise. In addition, the processor 120 may determine 55 dB, which is smaller than the magnitude of the ambient noise, or 65 dB, which is greater than that as the upper limit of the noise of the home appliance 100, as the upper limit of the noise.

Further, the processor 120 may determine the upper limit of the noise of the home appliance 100 using upper limit information of noise magnitude predetermined for each of a plurality of noise ranges.

Specifically, the processor 120 may confirm upper limit noise magnitude corresponding to the confirmed magnitude of the ambient noise of the home appliance 100 and determine the confirmed upper limit noise magnitude as the upper limit of noise of the home appliance 100 using the upper limit information of noise magnitude corresponding to each of a plurality of noise ranges such as 20 dB or lower, 20 to 30 dB, 30 to 50 dB, 50 to 60 dB, 60 to 70 dB, and 70 dB or higher.

For example, when the confirmed magnitude of the ambient noise of the home appliance 100 is 55 dB, the processor 120 may determine 55 dB as the upper limit of the noise of the home appliance 100 for a noise range that corresponds to 50 to 60 dB. In another example, when the confirmed magnitude of the ambient noise of the home appliance 100 is 40 dB, the processor 120 may determine 50 dB as the upper limit of the noise of the home appliance 100 for a noise range that corresponds to 30 to 50 dB.

The upper limit of the noise of the home appliance 100 may be differently determined depending on each function provided by the home appliance 100. For example, in a case where the home appliance 100 is a washing machine, an upper limit of the noise of the washing machine may be differently determined with respect to each of a washing function and a dehydration function of the washing machine.

The method for determining the upper limit of the noise of the home appliance 100 using the ambient noise information of the home appliance 100 is not limited to the example described above.

The processor 120 may obtain the ambient noise information of the home appliance 100 by various methods.

For example, the processor 120 may receive ambient noise information of a home appliance from an external device (not shown) that is disposed in the vicinity of the home appliance 100 to detect ambient noise of the home appliance 100. The specific operation regarding this will be described later with reference to FIG. 11.

In another example, the processor 120 may obtain ambient noise information of a home appliance by detecting ambient noise of the home appliance 100 using a microphone that is disposed in the home appliance 100. The specific operation regarding this will be described later with reference to FIG. 2.

When the ambient noise information of the home appliance 100 includes noise generated by the home appliance 100, the processor 120 may determine the upper limit of the noise of the home appliance 100 after removing the noise of the home appliance 100 from the ambient noise information of the home appliance 100. The specific operation regarding this will be described later with reference to FIG. 2.

The processor 120 may control a driving speed of the motor 110 to emit a magnitude of noise to be equal to or less than the upper limit of the noise.

Specifically, the processor 120 may obtain information regarding noise that is currently generated by the home appliance 100, and control a driving speed of the motor 110 using the obtained information to have the magnitude of the noise of the home appliance 100 equal to or less than the upper limit of the noise.

When the magnitude of the noise of the home appliance 100 exceeds the upper limit of the noise of the home appliance 100, the processor 120 may control the motor 110 to reduce the driving speed, thereby reducing the magnitude of the noise of the home appliance 100. On the other hand, when the magnitude of the noise of the home appliance 100 does not exceed the upper limit noise of the home appliance 100, the processor 120 may control the motor 110 according to the existing control profile for the efficient function execution.

The driving speed of the motor 110 may be controlled by different methods in accordance with the type of the home appliance 100.

For example, in a case where the home appliance 100 is a washing machine, loud noise generated by the washing machine may be generated due to an unbalanced load of laundry accommodated in a drum. Accordingly, when magnitude of noise of the washing machine exceeds the upper limit of the noise of the home appliance 100, the processor 120 may execute an untangling operation for resolving the unbalanced load of laundry. The untangling operation may be executed by controlling the motor 110 by the processor 120 in a way that the drum rotates in a reverse direction or alternately rotates in a forward direction and a reverse direction. When the unbalanced load of laundry accommodated in the drum is resolved by the untangling operation, the processor 120 may control the motor 110 according to the existing control profile for executing the function again.

Meanwhile, the processor 120 may obtain noise information of the home appliance 100 by various methods.

For example, the processor 120 may obtain the noise information of the home appliance 100 using acceleration information detected through an accelerometer disposed in the home appliance 100. The specific operation regarding this will be described later with reference to FIG. 2.

In another example, the processor 120 may obtain the noise information of the home appliance 100 using acceleration information detected through an accelerometer disposed in the home appliance 100 and sound information detected through a microphone disposed in the home appliance 100. The specific operation regarding this will be described later with reference to FIGS. 9 and 10.

The method for obtaining the noise information of the home appliance 100 by the processor 120 is not limited to the example described above.

In illustrating and describing FIG. 1, it is illustrated and described that the home appliance includes one motor, but in the implementation, the home appliance may include a plurality of motors and control each of the plurality of motors based on ambient noise information of the home appliance.

In addition, hereinabove, only the simple configuration constituting the home appliance have been shown and described, but in the implementation, various configurations may be additionally included. This will be describe hereinafter with reference to FIG. 2.

Figure 2:
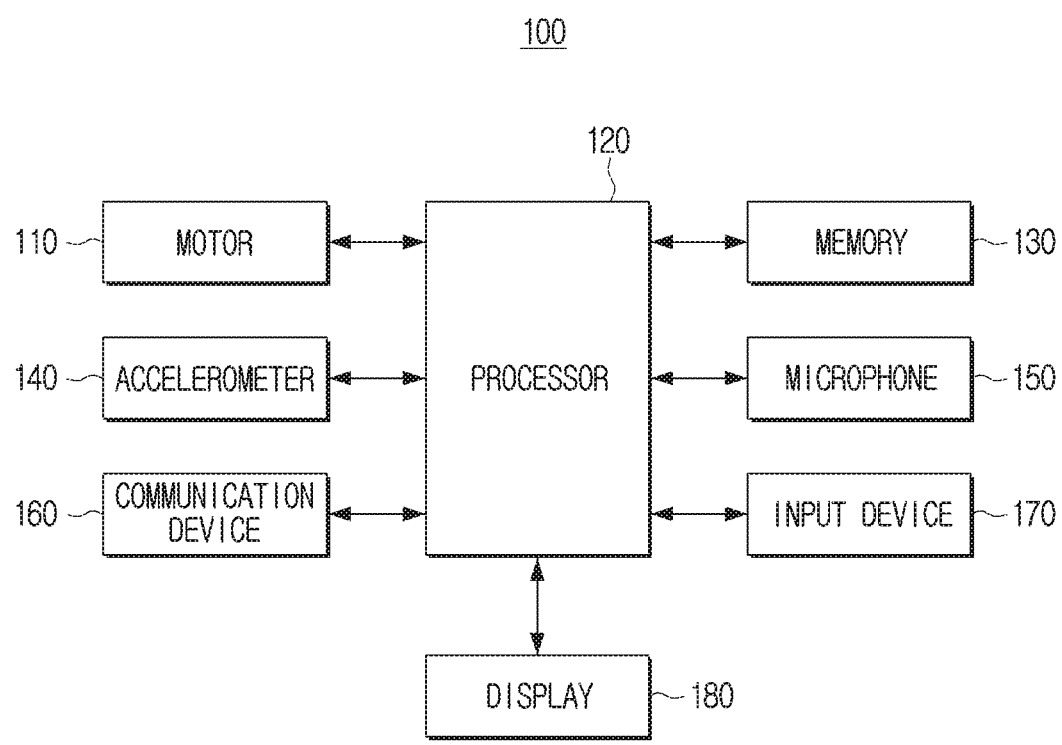
FIG. 2 is a block diagram showing a configuration of a home appliance according to an embodiment of the disclosure.

FIG. 2 is a block diagram showing a configuration of a home appliance according to an embodiment of the disclosure.

Referring to FIG. 2, the home appliance 100 according to an embodiment of the disclosure may be composed of the motor 110, the processor 120, a memory 130, an accelerometer 140, a microphone 150, a communication device 160, an input device 170, and a display 180.

The motor 110 executes the same function as the configuration of FIG. 1 and therefore the redundant descriptions will be omitted. The processor 120 have also described with reference to FIG. 1, and therefore the content described in FIG. 1 will not be repeated and only the content relating to the configurations added to FIG. 2 will be described hereinafter.

The memory 130 stores various pieces of data for general operations of the home appliance 100 such as programs for processing or controlling of the processor 120. Specifically, the memory 130 may store a plurality of application programs running in the home appliance 100, and data and instructions for the operations of the home appliance 100.

The memory 130 may be accessed by the processor 120 and reading, recording, editing, deleting, or updating of the data by the processor 120 may be executed. The memory 130 may be implemented as not only a storage medium in the home appliance 100, but also an external storage medium, a removable disk including a Universal Serial Bus (USB) memory, a web server through a network, and the like.

The memory 130 may store a plurality of pieces of noise level information according to the driving speed. The plurality of pieces of noise level information according to the driving speed correspond to information regarding noise magnitude of the home appliance 100 generated according to each driving speed of the motor 110.

The processor 120 may control the driving speed of the motor 110 to emit the magnitude of the noise of the home appliance 100 equal to or less than the upper limit of the noise, using the plurality of pieces of noise level information according to the driving speed stored in the memory 130. The specific operation regarding this will be described later with reference to FIG. 3.

The accelerometer 140 is configured to measure acceleration of an object. The accelerometer 140 may be disposed in the vicinity of the motor 110, measure acceleration of the motor 110, and generate information regarding the measured acceleration. The processor 120 may estimate noise of the home appliance 100 using the acceleration information to generate noise information.

Specifically, the processor 120 may extract an operation frequency of the motor 110 using the acceleration information, and generate reference data expressed as trigonometric functions having a specific size and phase using the extracted operation frequency. For example, in a case where 50 Hz is extracted as the operation frequency of the motor 110 from the acceleration information obtained from the accelerometer 140, the processor 120 may generate reference data expressed as trigonometric functions having a specific size and phase using 50 Hz.

The processor 120 may generate noise information of the home appliance 100 using the reference data and a noise estimation algorithm Specifically, the processor 120 may estimate noise generated by the home appliance 100 from the reference data using noise path estimation filter information included in the noise estimation algorithm.

The noise path estimation filter herein may be implemented as a finite impulse response (FIR) filter or an infinite impulse response (IIR) filter in a time domain. In addition, the noise path estimation filter may be implemented as a transfer function that is predetermined for each frequency band in a frequency domain. The noise path estimation filter may be stored in the memory 130 when manufacturing the home appliance 100.

The noise path estimation filter may have a linear structure as described above but is not limited thereto, and may have a nonlinear structure.

The method for generating estimation information regarding noise generated by the home appliance 100 using the acceleration information is not limited to the example described above.

The processor 120 may generate noise information of the home appliance 100 using the microphone 150. This will be described later in detail with reference to FIG. 9.

The microphone 150 may detect the ambient sounds of the home appliance 100 and output the detected sounds as a sound signal. Specifically, the microphone 150 may be disposed on a housing surface of the home appliance 100, detect ambient sounds of the home appliance 100, and output the detected sounds as a sound signal.

The processor 120 may obtain ambient noise information of the home appliance 100 through the microphone 150. The processor 120 may determine the upper limit of the noise of the home appliance 100 based on the obtained ambient noise information.

In a case where the motor 110 is driven when obtaining the ambient noise information of the home appliance 100 through the microphone 150, the obtained noise information may include noise of the home appliance 100. Accordingly, the processor 120 may determine the upper limit of the noise of the home appliance 100 after removing the noise of the home appliance 100 from the obtained ambient noise information.

Specifically, the processor 120 may obtain information regarding pure external noise by removing the noise of the home appliance 100 from the obtained ambient noise information, using the noise information of the home appliance 100 generated using the acceleration information. The processor 120 may determine the upper limit of the noise of the home appliance 100 using obtained information regarding pure external noise.

The processor 120 may obtain the ambient noise information of the home appliance 100 through the communication device 160.

The communication device 160 may be connected to an external device (not shown) and receive various pieces of data from the external device. Specifically, the communication device 160 may be connected to an external device through a local area network (LAN) or the Internet network, and may also be connected through a USB port or a wireless communication (for example, Wi-Fi 802.11a/b/g/n, near field communication (NFC), Bluetooth) port. The external device may be a personal computer (PC), a notebook computer, a smart phone, or a server.

The communication device 160 may receive the ambient noise information of the home appliance 100 from an external device. Specifically, the communication device 160 may receive the ambient noise information of the home appliance from an external device that is disposed in the vicinity of the home appliance 100 to detect the ambient noise of the home appliance 100.

More specifically, the communication device 160 may transmit a request for the ambient noise information of the home appliance 100 to an external device, and receive the ambient noise information of the home appliance 100 obtained in response to the transmitted request from the external device, under the control of the processor 120. The processor 120 may determine the upper limit of the noise of the home appliance 100 based on the obtained ambient noise information.

In a case where the motor 110 is driven when obtaining the ambient noise information of the home appliance 100 through the communication device 160, the obtained noise information may include noise generated by the home appliance 100. Accordingly, the processor 120 may determine the upper limit of the noise of the home appliance 100 using information regarding pure external noise, which is obtained by removing the noise generated by the home appliance 100 from the ambient noise information. The method for determining the upper limit of the noise has been described above and therefore any redundant description will be omitted.

As described above, the processor 120 may obtain the ambient noise information of the home appliance 100 using the microphone 150 included in the home appliance 100 or obtain the ambient noise information of the home appliance 100 from another device through the communication device 160, and combine the upper limit of the noise of the home appliance 100 using the obtained noise information.

The input device 170 may include a plurality of functional keys enabling a user to set or select various functions supported by the home appliance 100. Through these, a user may input various control instructions regarding the home appliance 100. For example, in a case where the home appliance 100 is a washing machine, a user may input a dehydration instruction of the washing machine through the input device 170.

The display 180 may display various pieces of information provided by the home appliance 100. Specifically, the display 180 may display an operation state of the home appliance 100 or display a user interface for functions selected by a user or option selection.

For example, in a case where the home appliance 100 is a washing machine, the display 180 may display that the washing machine is executing the dehydration operation or display an interface window to enable a user to select how long the dehydration function is to be operated for.

In illustrating and describing FIG. 2, it is illustrated and described that one accelerometer is included, but in the implementation, a plurality of accelerometers may be included.

In the related art, the driving speed of the motor was collectively controlled without any consideration regarding a state of the ambient noise of the home appliance. Accordingly, there was a problem that the efficiency of the home appliance was reduced by unnecessarily controlling the driving speed of the motor, even when inconvenience of a consumer due to the noise generated by the home appliance was offset due to generation of loud noise around the home appliance.

In contrast, as described above, the home appliance according to the embodiment may control the driving speed of the motor according to a state of the ambient noise of the home appliance. Therefore, when the ambient noise of the home appliance is small, the noise may be reduced by reducing the driving speed of the motor of the home appliance, and when the ambient noise of the home appliance is great, the motor may be controlled according to the existing control profile, thereby improving efficiency of the home appliance. That is, in some cases, both the effect of reducing the noise and the effect of improving efficiency of functions may be exhibited.

In addition, the home appliance controls the operation of the motor using the noise information, which is obtained by estimating the noise generated by the home appliance, and accordingly, an error from the actual noise generated by the home appliance may be reduced, compared to a case of performing the control using only vibration information of the motor, thereby more accurately reducing the noise.

Figure 3:
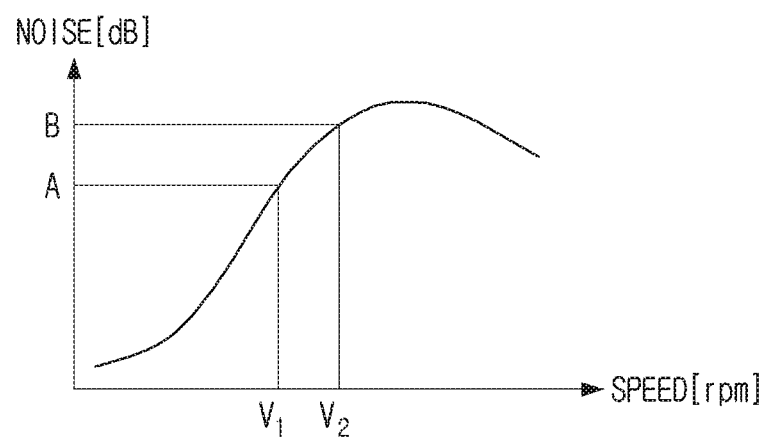
FIG. 3 is a block diagram for describing noise level information according to a driving speed according to an embodiment of the disclosure.

FIG. 3 is a block diagram for describing noise level information according to a driving speed according to an embodiment of the disclosure.

Referring to FIG. 3, it is described that the processor 120 controls the driving speed of the motor 110 to have the magnitude of the noise of the home appliance 100 equal to or less than the upper limit of the noise using the information regarding the magnitude of the noise currently generated by the home appliance 100.

In the implementation, the processor 120 may control the driving speed of the motor 110 to have the magnitude of the noise of the home appliance 100 equal to or less than the upper limit of the noise in a state where the noise information of the home appliance 100 is not obtained. Hereinafter, the specific operation regarding this will be described.

The processor 120 may control the driving speed of the motor 110 to have the magnitude of the noise of the home appliance 100 equal to or less than the upper limit of the noise using the plurality of pieces of noise level information according to the driving speed of the motor 110. The plurality of pieces of noise level information according to the driving speed of the motor 110 correspond to information regarding the magnitude of the noise of the home appliance 100 that is estimated according to each driving speed of the motor 110. The plurality of pieces of noise level information according to the driving speed of the motor 110 may be generated according to repeated test information and may be stored by a manufacturer when manufacturing the home appliance 100.

Specifically, the processor 120 may confirm a noise level corresponding to the upper limit of noise of the home appliance 100, determine the driving speed of the motor 110 corresponding to the confirmed noise level as an upper speed limit using the plurality of pieces of noise level information according to driving speed of the motor 110 stored in the memory 130 in advance, and may control the motor 110 to operate at a speed equal to or lower than the determined upper speed limit.

For example, referring to FIG. 3, in a case where the upper limit of the noise of the home appliance 100 is A dB, the processor 120 may determine $V_1$ rpm which is the driving speed of the motor 110 corresponding to A dB as the upper speed limit. The processor 120 may control the motor 110 to operate at a speed equal to or lower than $V_1$ rpm.

In another example, referring to FIG. 3, in a case where the upper limit of noise of the home appliance 100 is B dB, the processor 120 may determine $V_2$ rpm, which is the driving speed of the motor 110 corresponding to B dB, as the upper speed limit. The processor 120 may control the motor 110 to operate at a speed equal to or lower than $V_2$ rpm.

As described above, even when the noise information of the home appliance 100 is not obtained, the processor 120 may control the driving speed of the motor 110 to have the magnitude of the noise of the home appliance 100 equal to or less than the upper limit of the noise.

Figure 4:
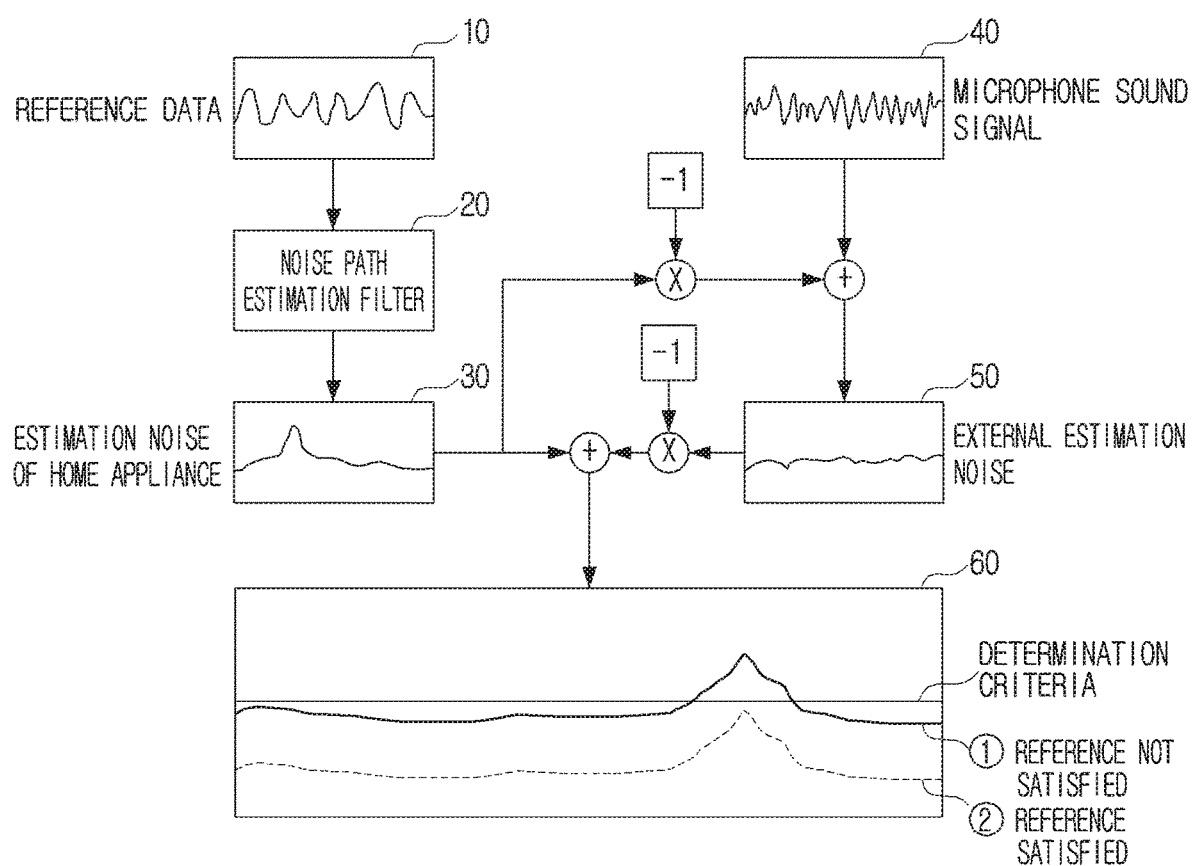
FIG. 4 is a view for describing a method for determining an upper limit of noise of a home appliance according to an embodiment of the disclosure.

FIG. 4 is a view for describing a method for determining an upper limit noise of a home appliance according to an embodiment of the disclosure.

Referring to FIG. 4, the home appliance 100 may generate estimation information 30 regarding the noise of the home appliance 100 by applying the reference data (for example, acceleration information obtained through the accelerometer 140) 10 to a noise path estimation filter 20.

The method for generating the estimation information 30 regarding the noise of the home appliance 100 is not limited to the example described above and the home appliance 100 may generate estimation information regarding the noise of the home appliance 100 using the microphone 150. This will be described later in detail with reference to FIG. 9.

The home appliance 100 may obtain ambient noise information 40 of the home appliance 100 through the microphone 150. The home appliance 100 may obtain estimation information 50 regarding pure external noise by removing the noise of the home appliance 100 from the ambient noise information 40 by using the estimation information 30 regarding the noise of the home appliance 100.

The home appliance 100 may determine the estimation information 50 regarding the external noise as the upper limit of the noise of the home appliance 100. Alternatively, the magnitude of the noise smaller or greater than the magnitude of the external noise by predetermined magnitude may be determined as the upper limit of the noise of the home appliance 100 and there is no limitation thereto.

The magnitude of the noise of the home appliance 100 and the upper limit of the noise magnitude may be compared to each other to generate analysis information 60, in order to confirm whether or not the magnitude of the noise of the home appliance 100 has exceed the upper limit of noise. Specifically, the home appliance 100 may confirm whether or not a value obtained by subtracting upper limit noise magnitude from the magnitude of the noise of the home appliance 100 exceeds 0, which is a determination reference, using the estimation information 30 regarding the noise of the home appliance 100 and upper limit of the noise of the home appliance 100.

Referring to FIG. 4, summary information 60 is illustrated. For instance, when the value of the analysis information exceeds 0 as denoted by ①, the noise of the home appliance 100 is greater than the external noise thereby exceeding the upper limit of the noise, and thus, the home appliance 100 may control to reduce the driving speed of the motor 110. On the other hand, when the value of the analysis information 60 does not exceed 0 as denoted by ②, the noise of the home appliance 100 is smaller than the external noise, thereby not exceeding the upper limit of the noise, and thus, the home appliance 100 may control the motor 110 according to the existing control profile.

In illustrating and describing FIG. 4, it is illustrated and described that the determination criteria is 0, but in the implementation, it may be set as a value greater or smaller than 0.

In addition, in illustrating and describing FIG. 4, it is illustrated and described that, when generating the information regarding the noise of the home appliance, the information regarding the noise of the home appliance is generated using only the information regarding the current operation of the motor. However, the information regarding the noise of the home appliance may be generated by additional considering the information regarding operations of the motor scheduled in the future. This will be described later in detail with reference to FIGS. 5 and 6.

In addition, in illustrating and describing FIG. 4, it is illustrated and described that, when determining the upper limit of the noise of the home appliance, the upper limit of the noise is generated using only the ambient noise information. However, the upper limit of the noise of the home appliance may be determined by additional considering user feedback information, time information, or the like. This will be described later in detail with reference to FIGS. 5, 7, and 8.

Figure 5:
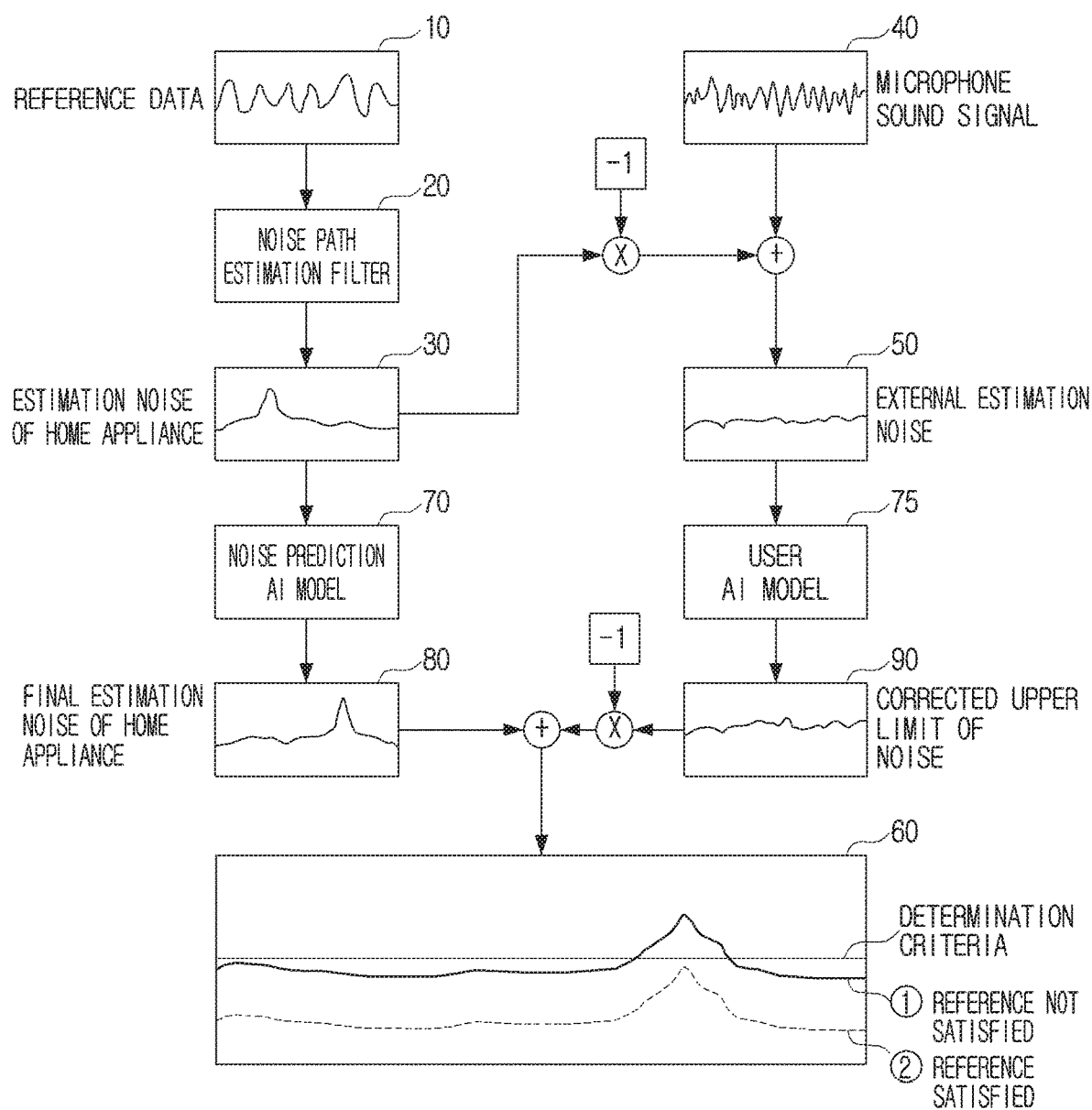
FIG. 5 is a view for describing a method for determining an upper limit noise of a home appliance according to an embodiment of the disclosure.

FIG. 5 is a view for describing a method for determining an upper limit of the noise of a home appliance according to an embodiment of the disclosure.

Referring to FIG. 5, the home appliance 100 may extract estimation information 30 regarding the noise of the home appliance 100 by applying reference data (for example, acceleration information obtained through the accelerometer 140) 10 to a noise path estimation filter 20.

The home appliance 100 may obtain ambient noise information 40 of the home appliance 100 through the microphone 150. The home appliance 100 may obtain estimation information 50 regarding pure external noise by removing the noise of the home appliance 100 from the ambient noise information 40 by using the estimation information 30 regarding the noise of the home appliance 100.

The home appliance 100 may generate final estimation information 80 regarding the noise of the home appliance 100 using the estimation information 30 regarding the noise of the home appliance 100 and operation information of the motor 110 regarding a predetermined function.

The operation information of the motor 110 regarding a predetermined function corresponds to information regarding the operation of the motor 110 over time when executing the predetermined function and may include information regarding a driving speed, a rotation direction, and the like of the motor 110 over time.

Specifically, the home appliance 100 may predict the noise to be generated by the home appliance 100 by expecting the operation of the motor scheduled in the future using the operation information of the motor 110 regarding the predetermined functions. The home appliance 100 may generate final estimation information 80 regarding the noise of the home appliance 100 including the information regarding noise expected to be generated by the home appliance 100 in the future. This will be described later in detail with reference to FIG. 6.

In addition to the method using the operation information of the motor 110 regarding the predetermined function, the home appliance 100 may generate the final estimation information 80 regarding the noise of the home appliance 100 using noise prediction artificial intelligence model 70.

The noise prediction artificial intelligence model 70 may obtain information regarding noise to be generated by the home appliance 100 in the future using a correlation between the information regarding the current noise of the home appliance 100 and the operation information of the motor 110 corresponding to the function being executed by the home appliance 100. This will be described later in detail with reference to FIG. 8.

The method for generating the final estimation information 80 regarding the noise of the home appliance 100 is not limited to the example described above.

The home appliance 100 may determine the estimation information 50 regarding the external noise as the upper limit of the noise of the home appliance 100. Alternatively, the home appliance 100 may determine magnitude of the noise smaller or greater than the magnitude of the external noise by predetermined magnitude as the upper limit of the noise of the home appliance 100 and there is no limitation thereto.

The home appliance 100 may generate corrected the upper limit of the noise by correcting the upper limit of the noise of the home appliance 100 using additional information.

Specifically, the home appliance 100 may generate corrected the upper limit of the noise of the home appliance 100 using predetermined time information to generate the corrected upper limit of the noise 90.

For example, a user may not be in a house from 8 a.m. to 6 p.m. due to work and the house may be very quiet in the corresponding time. In such a case, it is not necessary for the home appliance 100 to reduce the driving speed of the motor 110 in consideration of the ambient noise. Accordingly, when the time from 8 a.m. to 6 p.m. is set in the home appliance 100, the home appliance 100 may correct the upper limit of the noise of the home appliance 100 to have a relaxed criteria. The specific description regarding this will be described later with reference to FIG. 7.

In addition, the home appliance 100 may correct the upper limit of the noise of the home appliance 100 using user feedback information to generate the corrected upper limit of the noise 90.

Specifically, a degree of inconvenience regarding the noise of the home appliance 100 may be different for each user. Thus, the home appliance 100 may receive a feedback regarding the noise of the home appliance 100 from a user and relax or reinforce the upper limit of the noise of the home appliance 100 using the user feedback information.

The user feedback information herein may be obtained by various methods. For example, the home appliance 100 may receive a feedback from a user directly through the input device 170, receive user uttered sounds through the microphone 150 and obtain user feedback information through sound recognition of the input sounds, or receive user feedback information from an external device such as a user terminal device. The method for obtaining the user feedback information is not limited to the example described above.

In addition, the home appliance 100 may generate corrected upper limit noise by correcting the upper limit of the noise of the home appliance 100 using the user artificial intelligence model 75.

The user artificial intelligence model 75 corrects the upper limit of noise of the home appliance 100 using the user feedback information. This will be described later in detail with reference to FIG. 8.

In addition, the home appliance 100 may generate corrected the upper limit of the noise by correcting the upper limit of the noise of the home appliance 100 for each of a plurality of frequency bands.

Specifically, the home appliance 100 may obtain a frequency spectrum using the upper limit of the noise information of the home appliance 100 and execute the correction of the obtained frequency spectrum for each of the plurality of predetermined frequency bands.

For example, the home appliance 100 may reinforce the upper limit of the noise in a frequency band of 3,000 to 4,000 Hz to which humans are most sensitive, among audio frequency bands in the obtained frequency spectrum and execute the correction of relaxing the upper limit of the noise regarding the other frequency bands. The method for executing the correction for each frequency band is not limited to the example described above.

The home appliance 100 may compare the final magnitude of the noise of the home appliance 100 and the corrected upper limit of the noise 90 to each other in order to confirm whether or not the noise of the home appliance 100 has exceeded the current upper limit of the noise.

Specifically, the home appliance 100 may confirm whether or not a value obtained by subtracting magnitude of the corrected upper limit of noise from the final magnitude of the noise of the home appliance 100 exceeds 0, which is the determination using the final estimation information 80 regarding the noise of the home appliance 100 and the corrected upper limit of the noise 90.

When there is a time that the value of the analysis information 60 exceeds 0 as denoted by ①, the home appliance 100 may control to reduce the driving speed of the motor 110 in the day time corresponding thereto. On the other hand, when there is no time that the value of the analysis information 60 exceeds 0 as denoted by ②, the home appliance 100 may control the motor 110 according to the existing control profile.

In illustrating and describing FIG. 5, it is illustrated and described that the determination criteria is 0, but in the implementation, it may be set as a value greater or smaller than 0.

In addition, in a case of using the corrected upper limit of the noise 90 for each of the plurality of predetermined frequency bands, the home appliance 100 may compare frequency spectra of each of the final estimation information 80 regarding the noise of the home appliance 100 and the corrected upper limit of the noise 90 for each of the plurality of predetermined frequency bands.

When there is a frequency band having magnitude of noise greater than the corrected upper limit of the noise 90, the home appliance 100 may perform the control to reduce the driving speed of the motor 110. On the other hand, when there is no frequency band having magnitude of noise greater than the corrected upper limit of the noise 90, the home appliance 100 may control the motor 110 according to the existing control profile.

In illustrating and describing FIG. 5, the method for comparing the corrected upper limit of the noise to the magnitude of the noise of the home appliance has been illustrated and described as an example of controlling the driving speed of the motor using the corrected upper limit of the noise, but the upper speed limit of the motor corresponding to the corrected upper limit of the noise may be determined using the plurality of pieces of noise level information according to the driving speed stored in advance and the motor may be controlled by operating the motor at a speed equal to or lower than the determined upper speed limit. The method for controlling the driving speed of the motor using the corrected upper limit of the noise is not limited to the example described above.

As described above, the home appliance according to the embodiment predicts the noise to be generated by the home appliance in the future in advance and controls the operations of the motor using the predicted result, thereby preventing inconvenience of a user due to the noise of the home appliance in advance.

In addition, the home appliance according to the embodiment controls the operations of the motor in consideration of additional information relating to a user, in addition to the state of the ambient noise, thereby executing a noise control function suitable for preferences and living environment of a user.

Figure 6:
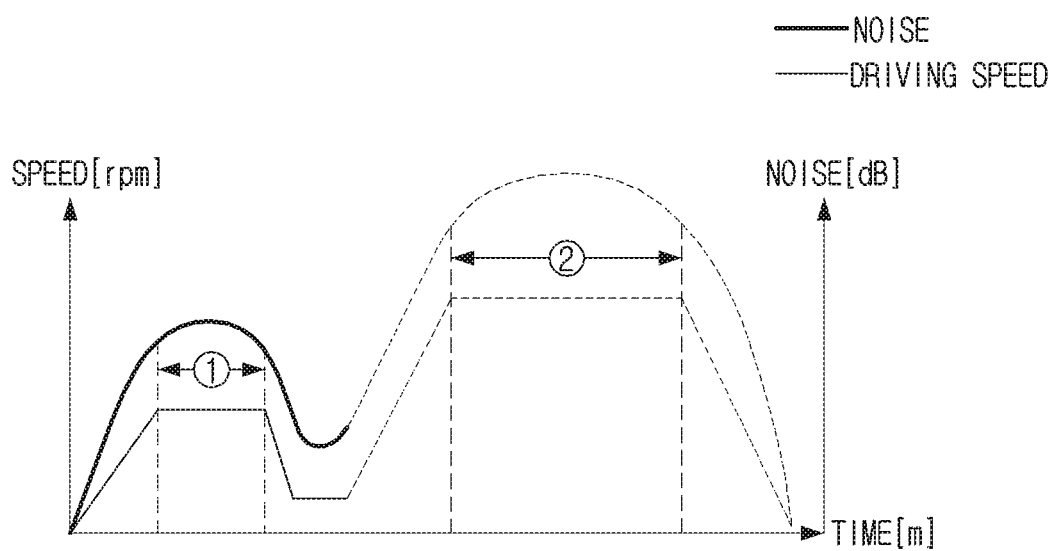
FIG. 6 is a view for describing a method for generating expected noise information of a home appliance using noise information of a home appliance according to an embodiment of the disclosure.

FIG. 6 is a view for describing a method for generating expected noise information of a home appliance using noise information of a home appliance according to an embodiment of the disclosure.

Referring to FIG. 6, the operation information of the motor 110 regarding a predetermined function is information regarding the operation of the motor 110 over time when executing the predetermined function and may include information regarding a driving speed, a rotation direction, and the like of the motor 110 over time.

For example, in a case where the home appliance 100 is a washing machine and the predetermined function is a dehydration function, the operation information of the motor 110 regarding the dehydration function may include information regarding a driving speed, a rotation direction, and the like of the motor 110 over time when executing the dehydration function.

The home appliance 100 may expect the operation of the motor scheduled in the future using the operation information of the motor 110 regarding the predetermined function.

For example, referring to FIG. 6, in a case of the dehydration function, it may be set so that the driving speed of the motor 110 is increased until it reaches a first driving speed, the driving speed is maintained at the first driving speed for a first period of time (①) and reduced again, the driving speed is increased again until it reaches a second driving speed that is faster than the first driving speed, and the then driving speed is maintained at the second driving speed for a second period of time (②). Accordingly, when the driving speed of the motor 110 reaches the first driving speed (①), the home appliance 100 may expect that the motor will increase the driving speed so that it reaches the second driving speed (②), based on the operation information of the motor 110 regarding the predetermined function.

The home appliance 100 may expect the noise to be generated by the home appliance 100 in the future using the noise information of the home appliance 100 and the expected operation information of the motor.

Specifically, the home appliance 100 may expect the noise to be generated by the home appliance 100 in the operation of the motor expected in the future, based on a correlation of an increase in magnitude of the noise of the home appliance 100 along with an increase in driving speed of the motor 110.

For example, in a case where a ratio of an increase in driving speed of the motor 110 to an increase in magnitude of the noise of the home appliance 100 is A, the home appliance 100 may calculate the current driving speed of the motor 110 and a driving speed of the motor 110 expected in the future, and expect the noise to be generated by the home appliance 100 by applying the ratio A to the calculated increases.

As described above, the home appliance 100 may generate final estimation information regarding the noise of the home appliance 100 including information regarding noise expected to be generated by the home appliance 100 in the future using the noise information of the home appliance 100 and the operation information of the motor 110 regarding the predetermined function.

Figure 7:
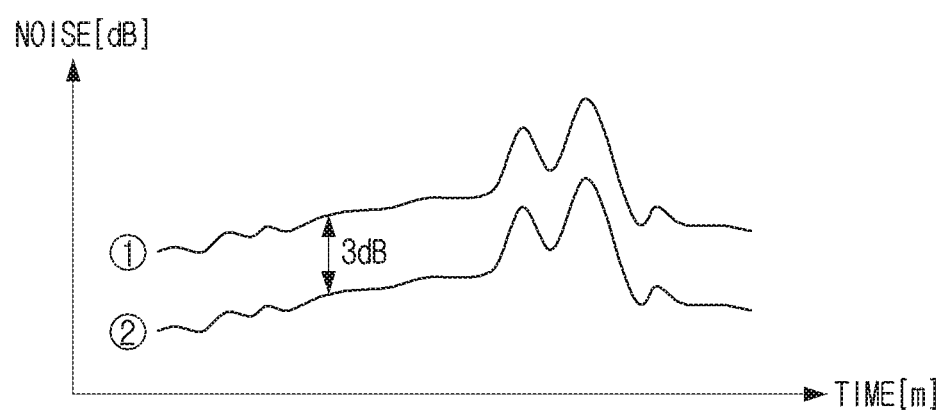
FIG. 7 is a view for describing a method for correcting an upper limit of noise of a home appliance according to an embodiment of the disclosure.

FIG. 7 is a view for describing a method for correcting an upper limit of the noise of a home appliance using time information according to an embodiment of the disclosure.

Referring to FIG. 7, the home appliance 100 may correct the upper limit of the noise of the home appliance 100 to a relaxed or reinforced criteria using predetermined time information.

Specifically, first, the home appliance 100 may confirm a current time corresponds to the predetermined time. In a case where the current time does not correspond to the predetermined time, the home appliance 100 may use the determined upper limit of the noise of the home appliance 100.

On the other hand, when the current time corresponds to the predetermined time, the home appliance 100 may confirm correction criteria information regarding the predetermined time. The correction criteria information may include information indicating how the determined upper limit noise is to be corrected. For example, the correction criteria information may include a content that indicates relaxing or reinforcing the upper limit of the noise by predetermined dB.

The home appliance 100 may correct the upper limit of the noise of the home appliance 100 based on the confirmed correction criteria information.

For example, the correction criteria information may include a content that indicates relaxing the upper limit of the noise by 3 dB. Accordingly, referring to FIG. 7, in a case where the current time does not correspond to the predetermined time, the home appliance 100 may use the determined upper limit of the noise (②) of the home appliance 100.

Alternatively, in a case where the current time does not correspond to the predetermined time, the home appliance 100 may use the upper limit of the noise (①) reduced by 3 dB from the determined upper limit of the noise (②) of the home appliance 100.

Figure 8:
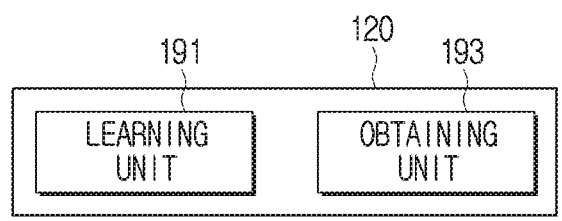
FIG. 8 is a block diagram showing a configuration of a home appliance for training and using an artificial intelligence model according to an embodiment of the disclosure.

FIG. 8 is a block diagram showing a configuration of a home appliance for training and using an artificial intelligence model according to an embodiment of the disclosure.

Referring to FIG. 8, the processor 120 may include at least one of a learning unit 191 and an obtaining unit 193.

As described above, the processor 120 may obtain the final noise information of the home appliance 100 including the information regarding the noise to be generated by the home appliance 100 in the future using the noise prediction artificial intelligence model 70.

Specifically, the learning unit 191 may generate or train the noise prediction artificial intelligence model 70, which predicts the noise to be generated by the home appliance 100 after a certain period of time, based on information regarding noise generated by the home appliance 100 for the specific period of time in the past and information regarding a function executed by the home appliance 100 at that time. In addition, the learning unit 191 may train or update the noise prediction artificial intelligence model 70 so that the predicted noise to be generated by the home appliance 100 coincides with the noise generated by the home appliance 100 after the specific period of time in the past. The learning unit 191 may correspond to a training set of an artificial intelligence model.

The obtaining unit 193 may obtain information regarding noise to be generated by the home appliance 100 in the future, using the current noise information of the home appliance 100 and information regarding a function currently executed by the home appliance 100 as input data of the noise prediction artificial intelligence model 70.

In addition, the processor 120 may obtain the corrected upper limit of the noise of the home appliance 100 using a user artificial intelligence model 75.

Specifically, the learning unit 191 may generate or train the user artificial intelligence model 75, which predicts the corrected upper limit of the noise, based on the user feedback information and the upper limit of the noise of the home appliance 100. In addition, the learning unit 191 may train or update the user artificial intelligence model 75 so that the predicted corrected upper limit of the noise coincides with the actual corrected upper limit of the noise.

The user feedback information may include information regarding a degree of inconvenience of a user for each magnitude of noise of the home appliance 100. In addition, the user feedback information may further include time information and indicating a degree of inconvenience of a user for each magnitude of noise of the home appliance 100 according to the time zone. The type of the user feedback information is not limited to the example described above.

The obtaining unit 193 may obtain the corrected upper limit of the noise using the determined upper limit of the noise of the home appliance 100 as input data of the user artificial intelligence model 75.

Figure 9:
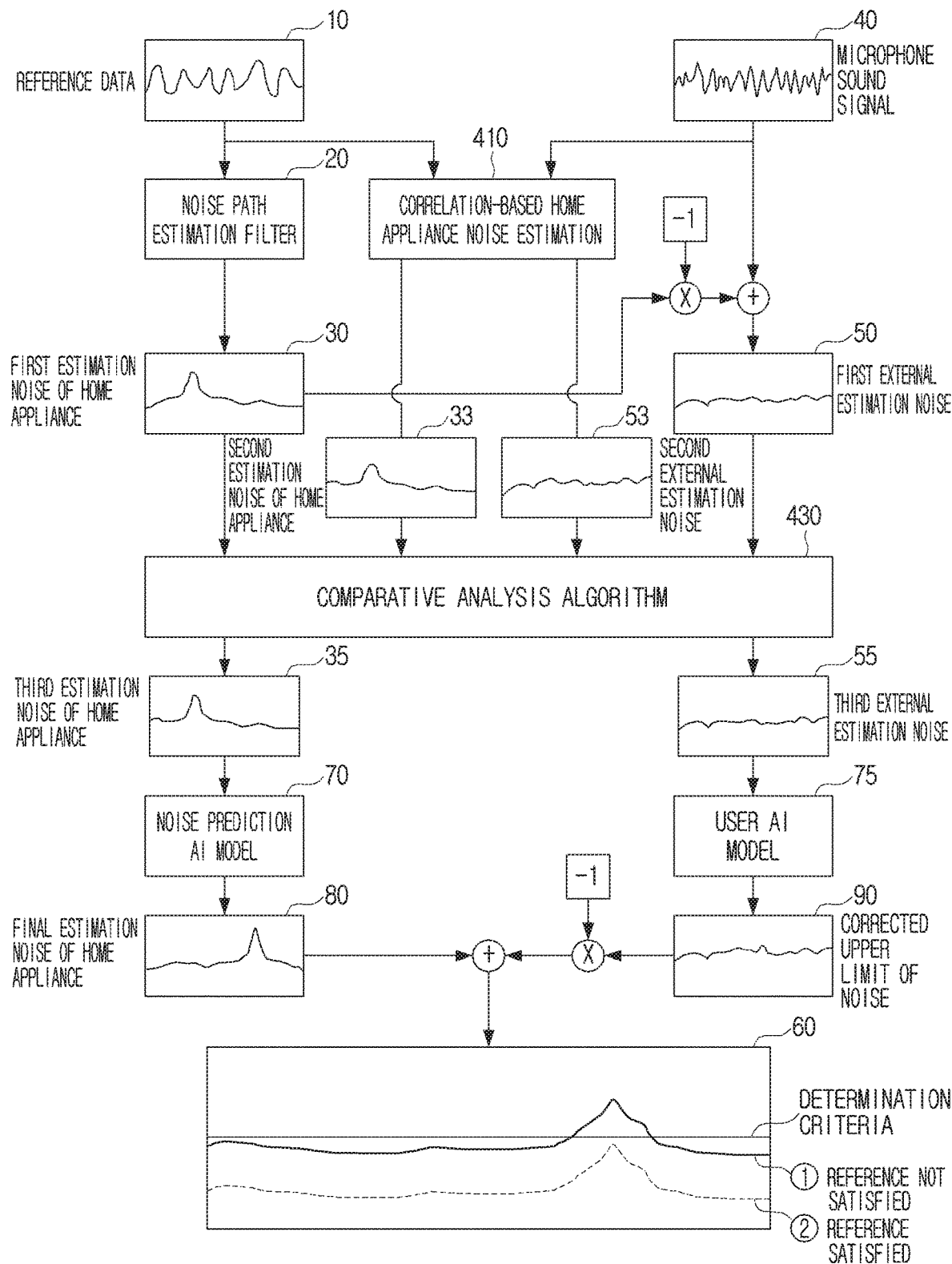
FIG. 9 is a view for describing a method for determining an upper limit of noise of a home appliance according to an embodiment of the disclosure.

FIG. 9 is a view for describing a method for determining an upper limit of the noise of a home appliance according to an embodiment of the disclosure.

Referring to FIG. 9, as described above, the processor 120 may generate the first estimation information 30 regarding the noise of the home appliance 100 using the acceleration information.

Meanwhile, in the method described above, the processor 120 may generate another piece of estimation information regarding the noise of the home appliance 100 using the ambient noise information 40 of the home appliance 100 obtained through the microphone 150 when driving the motor 110.

Specifically, the processor 120 may generate second estimation information 33 regarding the noise of the home appliance 100 using a correlation between the reference data 10 generated using the acceleration information and the ambient noise information 40 of the home appliance 100 detected through the microphone 150. In addition, the processor 120 may generate second estimation information 53 regarding external noise using the correlation.

For example, the processor 120 may input the reference data 10 and the ambient noise information 40 to a correlation-based home appliance noise estimation algorithm 410. The correlation-based home appliance noise estimation algorithm 410 may generate the second estimation information 33 regarding the noise generated by the home appliance 100 using following correlations in the frequency domain.

$$SXX=E[X \cdot XH] \quad (1)$$

$$SYX=E[Y \cdot XH] \quad (2)$$

$$H=SYX \cdot SXX-1 \quad (3)$$

$$H \cdot X=N \quad (4)$$

$$Y=H \cdot X+D \quad (5)$$

Herein, X represents reference data converted into a frequency domain, XH represents a Hermitian function of X, Y represents ambient noise information converted into a frequency domain, H represents a correlation transfer function, D represents second estimation information regarding external noise converted into a frequency domain, and N represents second estimation information regarding noise of a home appliance converted into a frequency domain.

That is, the processor 120 may obtain the second estimation information 33 regarding the noise of the home appliance 100 by converting N into a time domain in the expression described above. The processor 120 may generate the second estimation information 53 regarding external noise by converting D into a time domain in the expression described above.

The processor 120 may determine the upper limit of the noise of the home appliance 100 using the second estimation information 53 regarding the external noise and control the motor 110 by comparing the second estimation information 33 regarding the noise of the home appliance 100 to the upper limit of the noise.

The processor 120 may generate third estimation information 35 regarding the noise of the home appliance 100 using the first estimation information 30 and the second estimation information 33 regarding the noise of the home appliance 100.

Specifically, the processor 120 may compare the first estimation information 30 and the second estimation information 33 regarding the noise of the home appliance 100 to each other in terms of the magnitude of noise according to the frequency, and generate third estimation information 35 regarding the noise of the home appliance using a comparative analysis algorithm 430 of extracting a value of greater magnitude of noise for each frequency. This will be described later in detail with reference to FIG. 10.

As described above, by comparing the upper limit of the noise to the third estimation information 35 generated with only a greater value for each frequency domain by comparing the first estimation information 30 and the second estimation information 33, the noise generated by the home appliance 100 may be more conservatively controlled.

As another method for conservatively controlling the noise generated by the home appliance 100, the processor 120 may generate third estimation information 55 regarding the external noise using the first estimation information 50 and the second estimation information 53 regarding external noise for generating conservative upper limit of the noise.

Specifically, the processor 120 may confirm which external noise estimation information corresponds to the estimation information of the noise of the home appliance 100 extracted by having a value of the greater magnitude of the noise for each frequency, and generate third estimation information 55 regarding the external noise using the comparative analysis algorithm 430 of extracting the value the external noise estimation information confirmed for each frequency.

This is on the basis of properties that, in a case where the magnitude of the noise of the home appliance is great, the magnitude of the external noise corresponding thereto is relatively small, and when the third estimation information 55 is generated by the method described above, the generated third estimation information 55 may have generally smaller magnitude compared to the first estimation information 50 and the second estimation information 53.

For example, in a case where the noise magnitude of the first estimation information 30 regarding the noise of the home appliance 100 is greater than the noise magnitude of the second estimation 33 in a band of 200 Hz, the processor 120 may determine a corresponding value of the first estimation information 50 regarding the external noise in the band of 200 Hz as a value of the third estimation information 55 regarding the external noise in the band of 200 Hz.

In another example, in a case where the noise magnitude of the first estimation information 30 regarding the noise of the home appliance 100 is smaller than the noise magnitude of the second estimation 33 in a band of 300 Hz, the processor 120 may determine a corresponding value of the second estimation information 53 regarding the external noise in the band of 300 Hz as a value of the third estimation information 55 regarding the external noise in the band of 300 Hz.

As described above, by confirming the estimation information regarding the noise of the home appliance 100 having a greater value in each frequency band, and generating the third estimation information using the estimation information regarding the external noise corresponding to the confirmed estimation information regarding the noise of the home appliance 100, the third estimation information 55 regarding the external noise may have a generally smaller value compared to the first estimation information 50 and the second estimation information 53 with a high possibility. In addition, by determining the upper limit of the noise using the third estimation information 55, the noise generated by the home appliance 100 may be more conservatively controlled.

The method for generating the third estimation information 55 regarding the external noise is not limited to the example described above, and may be implemented as a method similar to the method for generating the third estimation information 35 regarding the noise of the home appliance. Specifically, the third estimation information 55 regarding the external noise may be generated by extracting a smaller value for each frequency band by comparing the first estimation information 50 and the second estimation information 53 regarding the external noise. The third estimation information 55 regarding the external noise generated may also have a generally smaller value with a high possibility, and therefore the noise generated by the home appliance 100 may be conservatively controlled.

The processor 120 may execute the subsequent processes using the third estimation information 35 regarding the noise of the home appliance 100 and the third estimation information 55 regarding the external noise generated. The specific description regarding this is redundant with the content described above and thus will be omitted.

Figure 10:
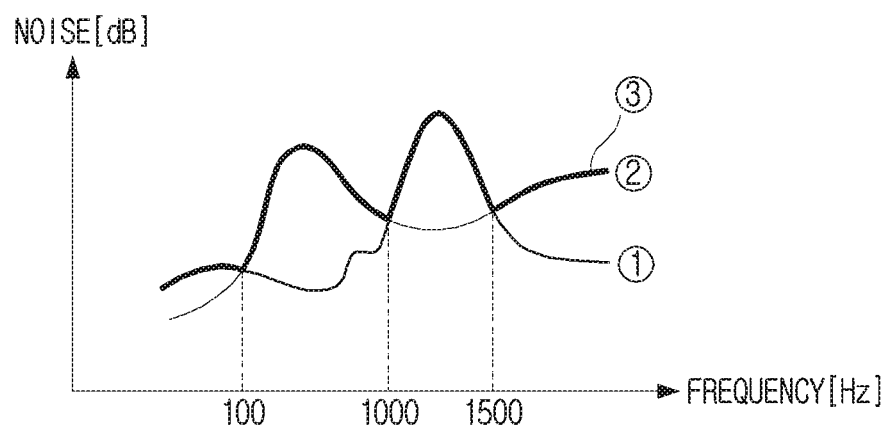
FIG. 10 is a view for describing an example of estimation information regarding noise of a home appliance according to an embodiment of the disclosure.

FIG. 10 is a view for describing an example of estimation information regarding noise of a home appliance according to an embodiment of the disclosure.

Referring to FIG. 10, it may be confirmed that the first estimation information (①) regarding the noise of the home appliance generated based on the noise path filter, and the second estimation information (②) regarding the noise of the home appliance generated based on the correlation are different from each other in terms of values of noise magnitude according to the frequency.

The processor 120 may generate the third estimation information (③) regarding the noise of the home appliance by comparing each noise magnitude of ① and ② at each frequency and extracting a value of the greater noise magnitude for each time using the comparative analysis algorithm 430.

For example, referring to FIG. 10, the noise magnitude of the second estimation information (②) regarding the noise of the home appliance 100 is greater than the noise magnitude of the first estimation information (①) in a band of 100 Hz to 1,000 Hz, and accordingly, the processor 120 may determine the value of the second estimation information (②) in a band of 100 Hz to 1,000 Hz as a value of the third estimation information (③) in a band of 100 Hz to 1,000 Hz.

In another example, referring to FIG. 10, the noise magnitude of the first estimation information (①) regarding the noise of the home appliance 100 is greater than the noise magnitude of the second estimation information (②) in a band of 1,000 Hz to 1,500 Hz, and accordingly, the processor 120 may determine the value of the first estimation information (①) in a band of 1,000 Hz to 1,500 Hz as a value of the third estimation information (③) in a band of 1,000 Hz to 1,500 Hz.

The processor 120 may compare the generated third estimation information (③) regarding the noise of the home appliance with the upper limit of the noise of the home appliance 100 and control the operation of the motor 110 according to a comparison result.

In illustrating and describing FIG. 10, it is illustrated and described that noise estimation information is generated using two pieces of estimation noise regarding the noise of the home appliance. However, noise estimation information may be generated using three or more pieces of estimation noise regarding the noise of the home appliance.

In addition, hereinabove, it is described that a series of operations for controlling the motor using the ambient noise of the home appliance is mainly executed by the home appliance, but an external device may execute some operations. The specific operation regarding this will be described below.

Figure 11:
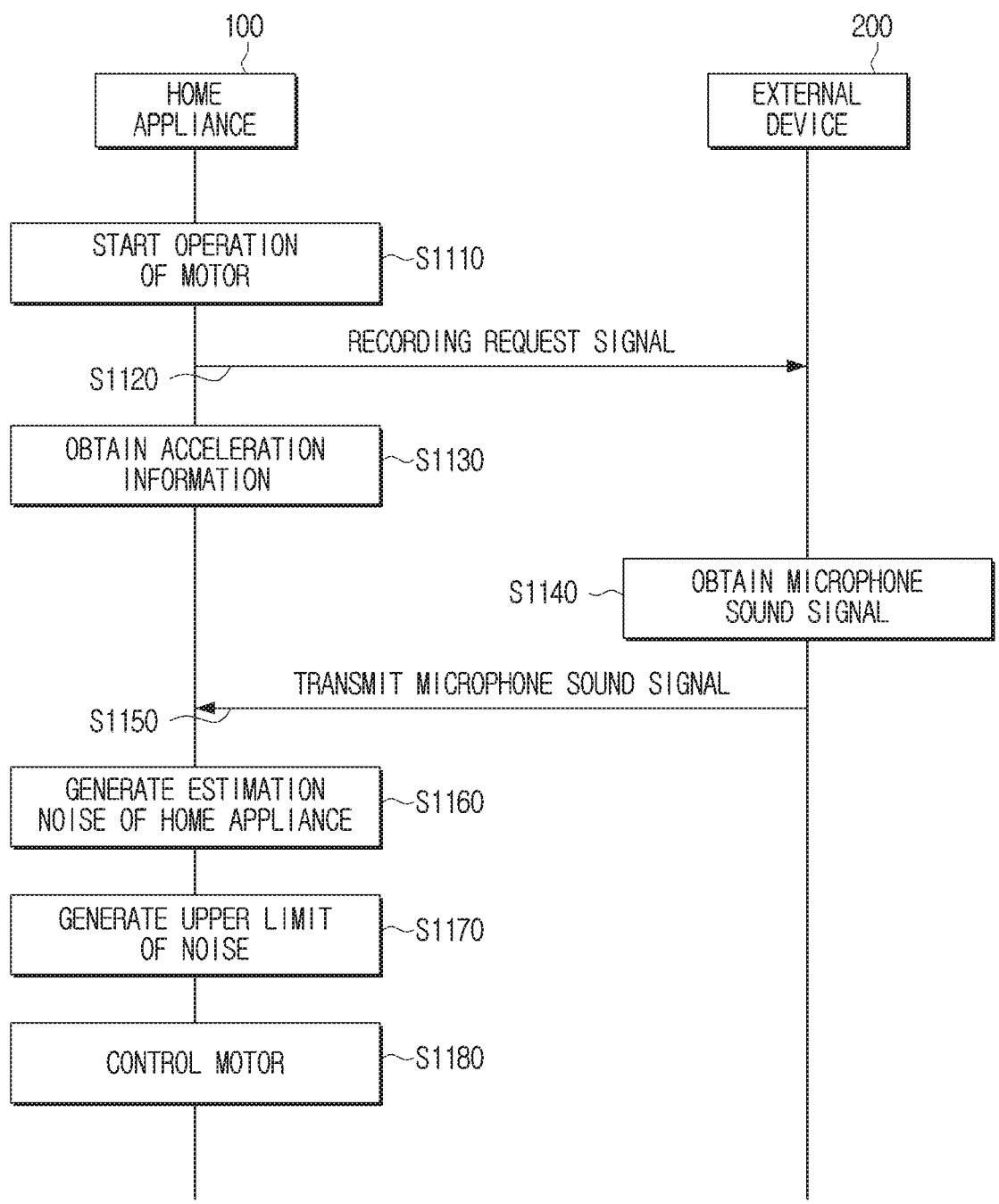
FIG. 11 is a sequence diagram for describing a method for determining upper limit noise of a home appliance using an external device according to an embodiment of the disclosure.

FIG. 11 is a sequence diagram for describing a method for determining upper limit of the noise of a home appliance using an external device according to an embodiment of the disclosure.

Referring to FIG. 11, first, the home appliance 100 may drive the motor 110 in operation S1110. Specifically, the home appliance 100 may drive the motor 110 according to a control instruction obtained by input of a user.

The home appliance 100 may transmit a recording request signal to an external device 200 in operation S1120. Specifically, the home appliance 100 may transmit the recording request signal to the external device 200 that includes a microphone and is disposed in the vicinity of the home appliance 100 to detect ambient sounds for a predetermined period of time.

The home appliance 100 may obtain acceleration information using the accelerometer 140 in operation S1130. Specifically, the home appliance 100 may obtain the acceleration information using the accelerometer 140 for a predetermined period of time in response to the recording request signal transmitted to the external device 200.

The external device 200 may obtain a microphone sound signal in operation S1140. Specifically, the external device 200 may obtain the microphone sound signal by detecting ambient sounds using the microphone for a predetermined period of time in response to the received recording request signal.

The external device 200 may transmit the obtained microphone sound signal to the home appliance 100 in operation S1150.

The home appliance 100 may generate estimation information regarding the noise of the home appliance 100 in operation S1160. Specifically, the home appliance 100 may generate estimation information regarding the noise of the home appliance 100 using the acceleration information, generate estimation information regarding the noise of the home appliance 100 using the acceleration information and the microphone sound signal, or generate estimation information regarding the noise of the home appliance 100 using the plurality of pieces of estimation information regarding the noise of the home appliance 100 generated in advance. The specific description regarding this has been described in relation to the operation of the processor 120, and therefore the redundant description will be omitted.

The home appliance 100 may determine an upper limit of noise of the home appliance 100 using the ambient noise information of the home appliance in operation S1170. Specifically, the home appliance 100 may determine an upper limit noise of the of the home appliance 100 using the microphone sound signal received from the external device 200 and the estimation information regarding the noise of the home appliance 100.

More specifically, the home appliance 100 may obtain information regarding pure external noise by removing the noise of the home appliance 100 from the microphone sound signal received from the external device 200, and determine the obtained information regarding the external noise as the upper limit of the noise of the home appliance 100. In the implementation, the home appliance 100 may determine noise smaller or greater than the external noise as the upper limit of the noise of the home appliance 100.

The home appliance 100 may control the operation of the motor 110 using the generated upper limit of the noise in operation S1180. The specific description regarding this has been described in relation to the operation of the processor 120 and thus the redundant description will be omitted.

As described above, the home appliance 100 may receive the microphone sound signal corresponding to the ambient noise of the home appliance from the external device, and accordingly, even in a case where the home appliance 100 does not include the microphone 150, the home appliance 100 may control the driving of the motor based on the ambient noise of the home appliance.

In illustrating and describing FIG. 11, it is illustrated and described that the home appliance generates the estimation information regarding the noise of the home appliance and determines the upper limit of the noise, but the home appliance may transmit the acceleration information to the external device, and the external device may generate the estimation information regarding the noise of the home appliance using the acceleration information and the microphone sound signal, and determine the upper limit of the noise.

Figure 12:
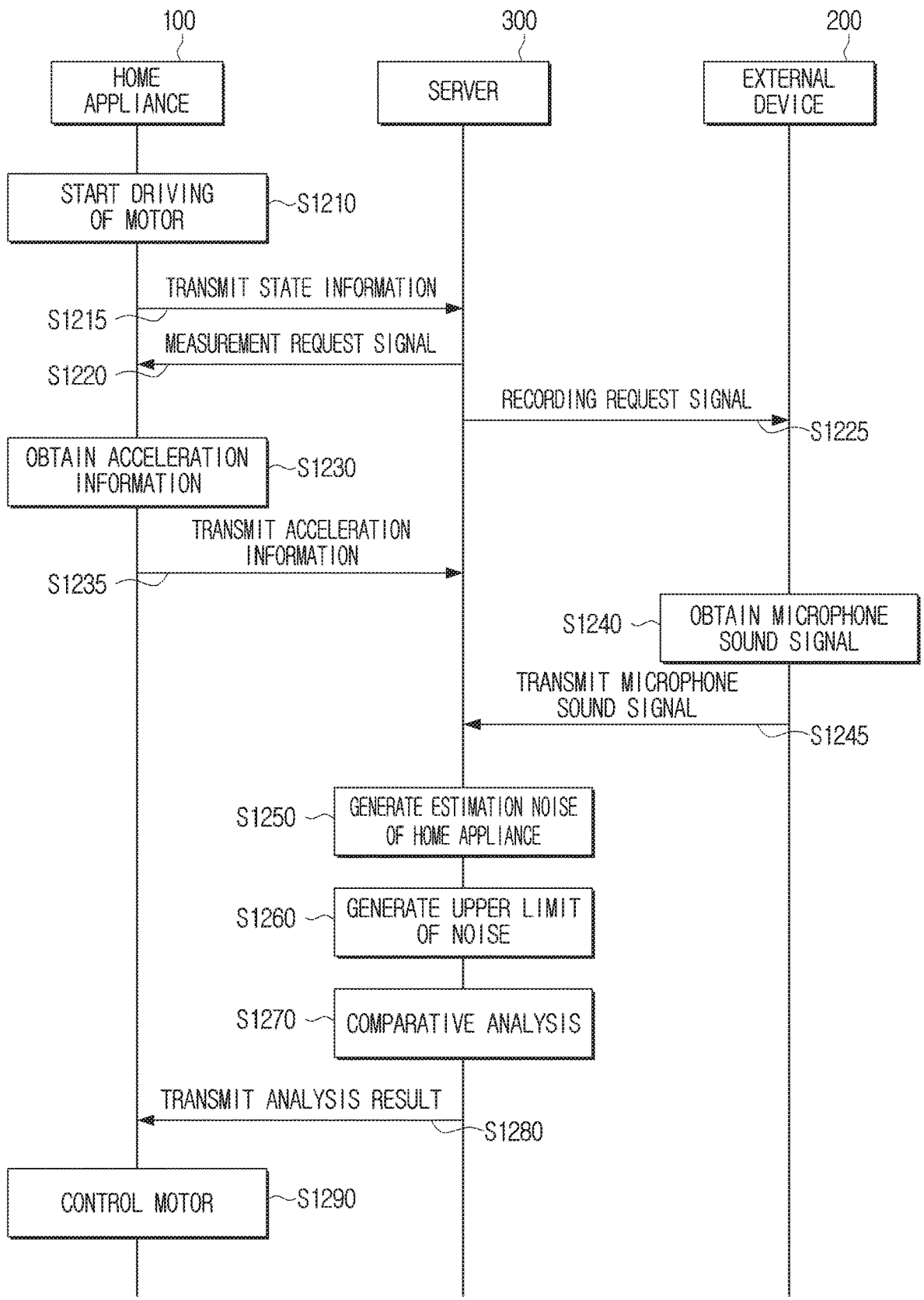
FIG. 12 is a sequence diagram for describing a method for determining upper limit noise of a home appliance using an external device according to an embodiment of the disclosure.

FIG. 12 is a sequence diagram for describing a method for determining upper limit of the noise of a home appliance using an external device according to the second embodiment of the disclosure.

Referring to FIG. 12, first, the home appliance 100 may drive the motor 110 in operation S1210. Specifically, the home appliance 100 may drive the motor 110 according to a control instruction obtained by input of a user.

The home appliance 100 may transmit state information to a server 300 in operation S1215. Specifically, the home appliance 100 may transmit state information including the operation information of the motor to the server 300.

The server 300 may transmit an acceleration measurement request signal to the home appliance 100 in operation 1220 and transmit a recording request signal to the external device 200 in operation S1225. Specifically, the server 300 may confirm the operation information of the motor included in the received state information of the home appliance 100, transmit the acceleration measurement request signal to the home appliance 100, when it is confirmed that the motor has reached the predetermined driving speed, and transmit the recording request signal to the external device 200 that includes a microphone and disposed in the vicinity of the home appliance 100.

The home appliance 100 may obtain the acceleration information using the accelerometer 140 in operation S1230. Specifically, the home appliance 100 may obtain acceleration information using the accelerometer 140 for a predetermined period of time in response to signal to request measurement received from the server 300. The home appliance 100 may transmit the obtained acceleration information to the server 300 in operation S1235.

The external device 200 may obtain the microphone sound signal in operation S1240. Specifically, the external device 200 may detect ambient sounds using the microphone for a predetermined period of time in response to the received recording request signal. The external device 200 may transmit the obtained microphone sound signal to the server 300 in operation S1245.

The server 300 may generate estimation information regarding the noise of the home appliance 100 in operation S1250. Specifically, the server 300 may generate estimation information regarding the noise of the home appliance 100 using the acceleration information, generate estimation information regarding the noise of the home appliance 100 using the acceleration information and the microphone sound signal, or generate estimation information regarding the noise of the home appliance 100 using the plurality of pieces of estimation information regarding the noise of the home appliance 100 generated in advance. The specific description regarding this has been described in relation to the operation of the processor 120, and therefore the redundant description will be omitted.

The server 300 may determine an upper limit of the noise of the home appliance 100 using the ambient noise information of the home appliance in operation S1260. Specifically, the server 300 may determine an upper limit of the noise of the home appliance 100 using the microphone sound signal received from the external device 200 and the estimation information regarding the noise of the home appliance 100.

The server 300 may generate a comparative result by comparing the noise estimation information of the home appliance 100 and the upper limit of the noise of the home appliance 100 in operation S1270. Specifically, the server 300 may confirm whether or not the noise of the home appliance 100 exceeds the upper limit of the noise by comparing the noise estimation information of the home appliance 100 and the upper limit of the noise of the home appliance 100 to each other, and generate a confirmed result.

The server 300 may transmit an analysis result to the home appliance 100 in operation 51280. Specifically, the server 300 may transmit the information indicating whether or not the noise of the home appliance 100 exceeds the upper limit of the noise. In a case where the noise of the home appliance 100 exceeds the upper limit of the noise, the server 300 may additionally transmit the information regarding the driving speed of the motor 110 so that the noise of the home appliance 100 has magnitude equal to or less than the upper limit of the noise.

The home appliance 100 may control the motor 110 in operation S1290 based on the received analysis result. Specifically, in a case where the analysis result indicating that the noise of the home appliance 100 does not exceed the upper limit of the noise is received from the server 300, the home appliance 100 may control the motor 110 according to the existing control profile.

On the other hand, in a case where the analysis result indicating that the noise of the home appliance 100 exceeds the upper limit of the noise is received from the server 300, the home appliance 100 may control the motor 110 to reduce the driving speed of the motor 110. In addition, in a case where the information regarding the driving speed of the motor 110 is additionally received from the server 300, the home appliance 100 may also control the operation of the motor 110 based on the received information.

As described above, instead of the home appliance, the server may generate the estimation information of the noise of the home appliance and determine the upper limit noise.

Figure 13:
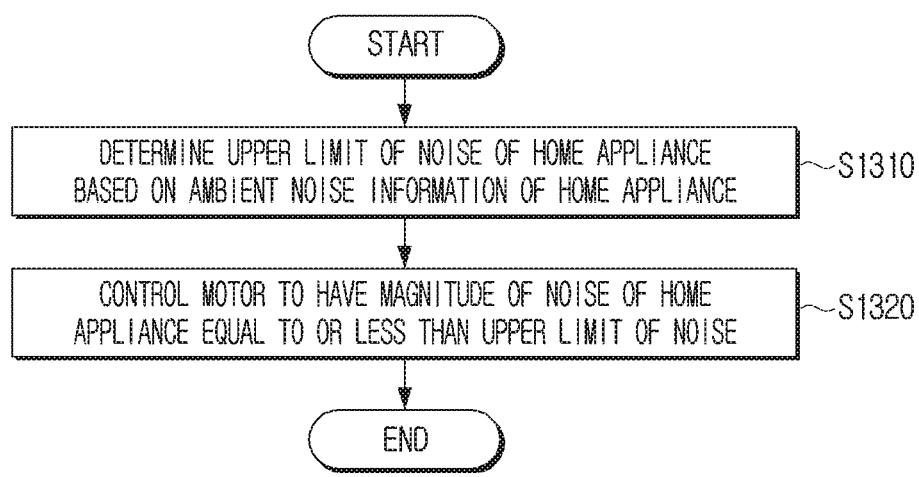
FIG. 13 is a flowchart for describing a method for controlling a home appliance according to an embodiment of the disclosure.

FIG. 13 is a flowchart for describing a method for controlling a home appliance according to an embodiment of the disclosure.

Referring to FIG. 13, first, an upper limit of the noise of a home appliance is determined based on ambient noise information of the home appliance in operation S1310. The upper limit of the noise of the home appliance corresponds a maximum allowable magnitude of noise generated by the home appliance. The upper limit of the noise of the home appliance may be expressed in a unit of dB. The unit of the upper limit of the noise of the home appliance is not limited to the example described above.

Specifically, the magnitude of the ambient noise of the home appliance included in the ambient noise information of the home appliance may be confirmed, and the upper limit of the noise of the home appliance may be determined using the confirmed magnitude of the ambient noise of the home appliance.

More specifically, the magnitude of the noise identical to the confirmed magnitude of the ambient noise of the home appliance may be determined as the upper limit of the noise of the home appliance, and the magnitude of noise smaller or greater than the confirmed magnitude of the ambient noise of the home appliance by predetermined magnitude may be determined as the upper limit of the noise of the home appliance. The method for determining the upper limit of the noise of the home appliance using the ambient noise information of the home appliance is not limited to the example described above.

The ambient noise information of the home appliance may be obtained by various methods.

Specifically, the ambient noise information of the home appliance may be received from an external device that is disposed in the vicinity of the home appliance to detect ambient noise of the home appliance.

In addition, the ambient noise information of the home appliance may be detected using a microphone disposed in the home appliance. Specifically, transmission of the ambient noise information of the home appliance is requested to the external device, and the ambient noise information of the home appliance may be obtained from the external device.

In a case where the motor of the home appliance was being driven when obtaining the ambient noise information of the home appliance, the noise of the home appliance is included in the ambient noise information of the home appliance. Therefore, information regarding pure external noise may be obtained by removing the noise of the home appliance from the ambient noise information of the home appliance, and the upper limit of the noise of the home appliance may be determined using the obtained information regarding the external noise. The method for obtaining the noise of the home appliance will be described later.

The driving speed of the motor is controlled to have the magnitude of the noise of the home appliance equal to or less than the determined upper limit of the noise in operation S1320.

Specifically, the driving speed of the motor is controlled to have the magnitude of the noise of the home appliance equal to or less than the determined upper limit of the noise using a plurality of pieces of noise level information according to the driving speed stored in advance. The plurality of pieces of noise level information according to the driving speed correspond to information regarding noise magnitude of the home appliance estimated according to each driving speed of the motor.

More specifically, a noise level corresponding to the upper limit of the noise of the home appliance may be confirmed using the plurality of pieces of noise level information according to the driving speed stored in advance, the driving speed of the motor corresponding to the confirmed noise level may be determined as the upper speed limit, and the motor may be controlled to operate at a speed equal to or lower than the determined upper speed limit.

Such a method may also be applied in a case where there is no information regarding the noise of the home appliance.

Meanwhile, the driving speed of the motor may be controlled to have the magnitude of the noise of the home appliance equal to or less than the determined upper limit of the noise by another method.

Specifically, the information regarding the magnitude of the noise currently generated by the home appliance is obtained, and the driving speed of the motor may be controlled to have the magnitude of the noise of the home appliance equal to or less than the upper limit of the noise using the obtained information.

More specifically, the acceleration information may be estimated using an accelerometer included in the home appliance. The noise information of the home appliance may be obtained using the acceleration information. The driving speed of the motor may be controlled to have the magnitude of the noise of the home appliance equal to or less than the upper limit of the noise using the obtained noise information of the home appliance.

Expected noise information of the home appliance may be generated using the noise information of the home appliance, and the driving speed of the motor may be controlled using the noise information and the expected noise information of the home appliance and the determined upper limit of the noise.

Specifically, the expected noise information that is regarding the noise to be generated by the home appliance may be generated by expecting the operation of the motor scheduled in the future using operation information of the motor regarding a predetermined function.

The operation information of the motor regarding a predetermined function herein is information regarding the operation of the motor over time when executing the predetermined function and may include information regarding a driving speed, a rotation direction, and the like of the motor over time.

The driving speed of the motor may be controlled using the generated expected noise information, the noise information of the home appliance, and the determined upper limit of the noise.

The upper limit of the noise may be corrected using additional information, before controlling the motor using the upper limit of the noise, and the operation of the motor may be controlled using the corrected upper limit of the noise.

Specifically, the upper limit of the noise of the home appliance may be corrected using predetermined time information. The driving speed of the motor may be controlled by comparing the corrected upper limit of the noise to the noise information of the home appliance.

More specifically, the current time may be confirmed and it may be confirmed whether or not the current time corresponds to the predetermined time. In a case where the current time does not correspond to the predetermined time, the determined upper limit of the noise of the home appliance may be used as it is. On the other hand, in a case where the current time corresponds to the predetermined time, correction criteria information regarding the predetermined time may be confirmed. The correction criteria information may include information indicating how the determined upper limit of the noise is to be corrected. For example, the correction criteria information may include a content that indicates relaxing or reinforcing the upper limit of the noise by predetermined dB. The upper limit of the noise of the home appliance 100 may be corrected based on the confirmed correction criteria information.

In addition, the upper limit of the noise of the home appliance may be corrected using user feedback information. Specifically, a feedback regarding the noise of the home appliance is received from a user and the upper limit of the noise of the home appliance may be relaxed or reinforced using the user feedback information. The driving speed of the motor may be controlled by comparing the corrected upper limit of the noise and the noise information of the home appliance.

In addition, a frequency spectrum of the upper limit of the noise may be corrected for each of a plurality of predetermined frequency bands. More specifically, a frequency spectrum may be obtained using the upper limit of the noise information of the home appliance, and the obtained frequency spectrum may be corrected for each of the plurality of predetermined frequency bands.

The driving speed of the motor may be controlled by comparing the frequency spectra of each of the corrected upper limit of the noise and the noise information of the home appliance for each of the plurality of predetermined frequency bands.

Therefore, in the method for controlling a home appliance of the disclosure, the driving speed of the motor is controlled in accordance with to the state of the ambient noise of the home appliance, and thus, the effect of suitably providing the effect of reducing the noise in accordance with the state and the effect of improving efficiency of functions may be exhibited. The method for controlling a home appliance shown in FIG. 13 may be executed for the home appliance having the configuration of FIG. 1 or FIG. 2 and may also be executed for a home appliance having other configurations.

In addition, the method for controlling described above may be implemented as at least one program for executing the method for controlling described above, and such a program may be stored in a non-transitory readable medium.

The non-transitory readable medium semi-permanently stores data and is readable by a machine. For example, various applications or programs described above may be stored and provided in the non-transitory readable medium such as a compact disc (CD), a digital versatile disc (DVD), a hard disk, a Blu-ray disc, a USB, a memory card, and a read only memory (ROM).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A home appliance comprising:
   a motor configured to execute a predetermined function of the home appliance;
   an accelerometer configured to generate acceleration information by measuring acceleration of the motor; and
   at least one processor configured to:
      determine an upper limit of noise of the home appliance based on ambient noise information,
      control a driving speed of the motor to have magnitude of noise of the home appliance equal to or less than the upper limit of the noise,
      redetermine the upper limit of the noise during a user's absence or base d on a predicted noise information of the home appliance, and
      control the driving speed of the motor using the redetermined upper limit of the noise,
   wherein the processor is further configured to:
      extract an operation frequency of the motor using the acceleration information,
      generate reference data having a predetermined size and phase using the extracted operation frequency,
      generate noise information of the home appliance using the reference data and a noise estimation algorithm, and
      control the driving speed of the motor using the noise information and the upper limit of the noise of the home appliance.

2. The home appliance of claim 1, further comprising:
   a memory configured to store noise level information according to the driving speed,
   wherein the at least one processor is further configured to:
      determine an upper speed limit of the motor using the upper limit of the noise and the noise level information, and
      control the driving speed of the motor to operate at a speed equal to or less than the upper speed limit.

3. The home appliance of claim 1, wherein the at least one processor is further configured to:
   generate the predicted noise information of the home appliance using the noise information of the home appliance, and
   control the driving speed of the motor using the noise information, the predicted noise information, and the upper limit of the noise of the home appliance.

4. The home appliance of claim 1, wherein the at least one processor is further configured to determine the upper limit of the noise of the home appliance by removing the noise of the home appliance from the ambient noise information using the noise information of the home appliance.

5. The home appliance of claim 1, further comprising:
   a microphone configured to measure ambient sounds,
   wherein the at least one processor is further configured to obtain the ambient noise information through the microphone.

6. The home appliance of claim 1, further comprising:
   a communication device,
   wherein the at least one processor is further configured to:
      control the communication device to request an external device to transmit ambient noise information, and
      obtain the ambient noise information from the external device.

7. The home appliance of claim 1, wherein the at least one processor is further configured to:
   determine a frequency spectrum of the upper limit of the noise for a plurality of predetermined frequency bands, and
   control the driving speed of the motor using the determined frequency spectrum of the upper limit of the noise.

8. The home appliance of claim 1, wherein the at least one processor is further configured to:
   redetermine the upper limit of the noise using feedback information of a user regarding noise information of the home appliance, and
   control the driving speed of the motor using the redetermined upper limit.

9. A method for controlling a home appliance including a motor, the method comprising:
   determining an upper limit of noise of the home appliance based on ambient noise information;
   controlling a driving speed of the motor to have magnitude of noise of the home appliance equal to or less than the upper limit of the noise;
   redetermining the upper limit of the noise during a user's absence or based on a predicted noise information of the home appliance; and
   controlling the driving speed of the motor using the redetermined upper limit of the noise,
   wherein the controlling of the driving speed of the motor comprising:
      generating acceleration information by measuring acceleration of the motor,
      extracting an operation frequency of the motor using the acceleration information,
      generating reference data having a predetermined size and phase using the extracted operation frequency, generating noise information of the home appliance using the reference data and a noise estimation algorithm, and controlling the driving speed of the motor using the noise information and the upper limit of the noise of the home appliance.

10. The method of claim 9, further comprising:

storing noise level information according to the driving speed, wherein the controlling of the driving speed of the motor comprises:

determining an upper speed limit of the motor using the upper limit of the noise and the noise level information; and controlling the driving speed of the motor to operate at a speed equal to or less than the upper limit speed.

11. The method of claim 9, further comprising:

generating the predicted noise information of the home appliance using the noise information of the home appliance, wherein the controlling of the driving speed comprises controlling the driving speed of the motor using the noise information, the predicted noise information, and the upper limit of the noise of the home appliance.

12. The method of claim 9, wherein the determining of the upper limit of the noise of the home appliance comprises determining the upper limit of the noise of the home appliance by removing the noise of the home appliance from the ambient noise information using the noise information of the home appliance.

13. The method of claim 9, further comprising:

measuring the ambient noise information using a microphone.

14. The method of claim 9, further comprising:

requesting an external device to transmit ambient noise information; and obtaining the ambient noise information from the external device.

15. The method of claim 9, further comprising:

determining a frequency spectrum of the upper limit of the noise for a plurality of predetermined frequency bands, wherein the controlling of the driving speed of the motor comprises controlling the driving speed of the motor using the determined frequency spectrum of the upper limit of the noise.

16. The method of claim 9, further comprising:

redetermining the upper limit using feedback information of a user regarding noise information of the home appliance, wherein the controlling of the driving speed of the motor comprises controlling the driving speed of the motor using the redetermined upper limit of the noise.

* * * * *